(12) United States Patent
Weems

(10) Patent No.: US 6,650,212 B1
(45) Date of Patent: Nov. 18, 2003

(54) ELECTROMAGNETIC LATCH

(75) Inventor: Weyman Weems, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/174,791

(22) Filed: Jun. 19, 2002

(51) Int. Cl.[7] .............................................. H01F 7/20
(52) U.S. Cl. .................................................... 335/285
(58) Field of Search ............................... 335/285–295; 294/65.5, 88

(56) References Cited

U.S. PATENT DOCUMENTS

| | | | |
|---|---|---|---|
| 3,984,795 A | 10/1976 | Gaskill | 335/170 |
| 4,664,559 A | 5/1987 | Berrang | 405/224 |
| 4,965,695 A | 10/1990 | Baumann | 261/142 |

*Primary Examiner*—Ramon M. Barrera
(74) *Attorney, Agent, or Firm*—Marsh & Fischmann & Breyfogle LLP

(57) ABSTRACT

An electromagnetic latching assembly is disclosed that provides a mechanically advantageous holding force for securing two objects relative to one another. Generally, the assembly contains at least one and preferably two levers that are mounted to a frame so that they may pivot between open and closed positions. The frame is mounted to a first object and the lever(s) applies a holding force to a second object when the lever(s) is in the closed position. A permanent magnet is used to apply a magnetic restraining force to maintain the lever(s) in the closed position. The magnetic restraining force utilizes the leverage of the lever(s) to effectively apply an amplified holding force to the second object when the assembly is in the closed position. An electromagnet, which may be remotely actuated, is utilized selectively counteract the magnetic restraining force and allow the latch assembly to open and release the second object.

48 Claims, 5 Drawing Sheets

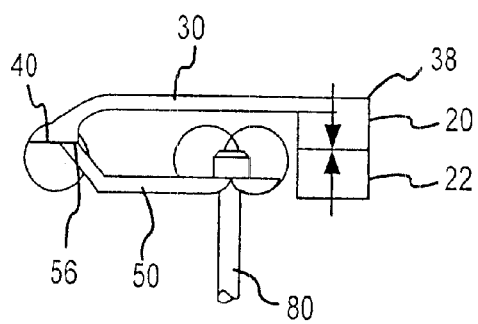
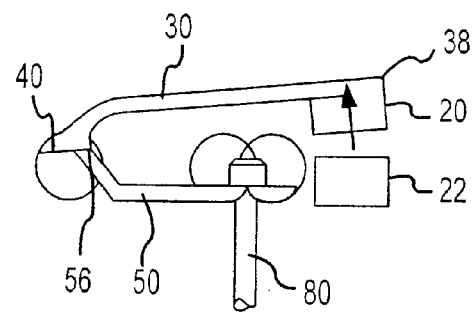
FIG.3A  FIG.3B
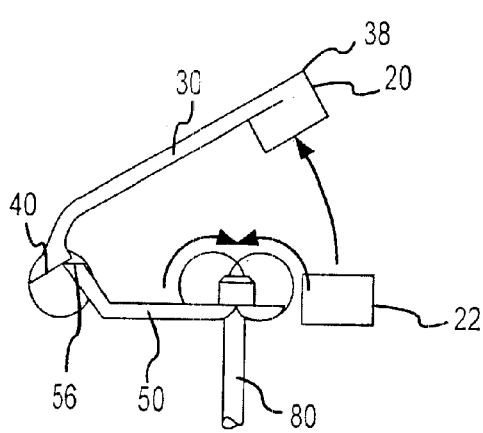
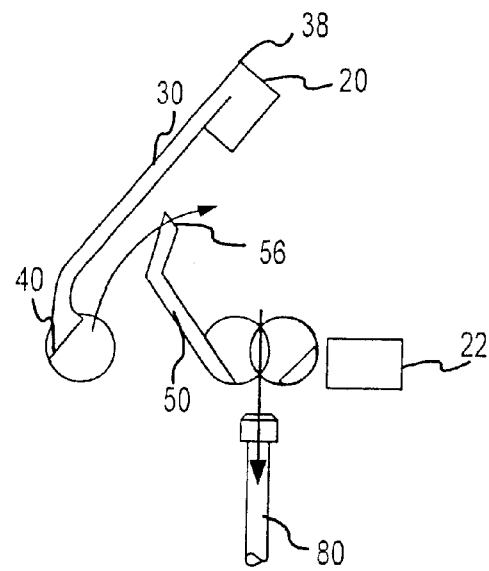
FIG.3C  FIG.3D

ELECTROMAGNETIC LATCH

FIELD OF THE INVENTION

The present invention relates to remotely operable latching assemblies. More particularly, the present invention relates to remotely operable latching assemblies that utilize magnetic forces to supply both the latching force and the releasing force for the latch assembly.

BACKGROUND OF THE INVENTION

In many applications it is desirable to utilize a latching system to releasably secure two or more structures together. In particular, spaced-based applications often utilize remotely operable latch systems to releasably hold one component to another. For example, a payload may be releasably attached to a space launch vehicle for launch and released once orbit is attained. Alternatively, the payload itself may utilize remotely operable latches for one or more purposes, such as deploying solar panels after separation from a launch vehicle.

Various remotely operable latching systems are available for space-based applications. For example, a number of pyrotechnic separation systems exist that utilize some sort of explosive charge to release objects held relative to one another. One drawback of these systems is the inability to test the actual components that will be utilized for the space-based application. As will be appreciated, once these pyrotechnic systems are "activated," one or more of their components is destroyed. Therefore, until the moment of activation, it is unknown whether these untested components will properly function.

SUMMARY OF THE INVENTION

It is an objective of the present invention to provide a remotely operable latch assembly for releasably holding two objects relative to one another.

It is a further objective of the present invention to provide a latch that provides a mechanically advantageous holding force for securing two objects together.

It is a further objective of the present invention to provide a remotely operable latch assembly having little or no power requirements while in a latched position.

It is a further objective of the present invention to provide a remotely operable latch assembly that is resettable to allow for non-destructive testing of the latch assembly.

It is a further objective to provide a latch assembly that is simple to manufacture and that utilizes readily obtainable parts.

These and additional objectives are achieved by the present invention which provides an electromagnetic latching assembly operable to apply a mechanically advantageous force for holding a first structure relative to a second structure and which may be remotely actuated to release these structures from one another. In this regard, a first retaining force is utilized to maintain the latching assembly in a closed position while the latching assembly secures the first and second structures together with a second holding force. Preferably, the retaining force will be smaller than the resulting holding force by at least an order of magnitude. The latching assembly utilizes a magnet to apply the retaining force that maintains the latch in the closed position, and a selectively actuateable electromagnet to open the latch assembly and thereby release the first and second structures from one another. Generally, the present invention is embodied in a latching assembly that utilizes at least one, and more preferably two levers interconnected to a frame to provide the mechanically advantageous holding force.

An electromagnetic latch assembly of a first aspect of the present invention includes: a frame that is interconnectable with a first member and contains at least a first aperture; a first lever interconnected to the frame that is pivotable between a first holding position and a first release position; a second lever interconnected to the frame that is pivotable between a second holding position and a second release position and comprising at least a second aperture; a permanent magnet associated with the first lever; and an electromagnet operatively associated with the first lever. Each of the first and second levers contains a free end that is operable to pivot relative to the frame. Further, when the latch assembly is in a closed position, the free end of the second lever is retained under the free end of the first lever. When the latch assembly is in the closed position, the permanent magnet applies a holding force that maintains the first lever in the first holding position and thereby holds the second lever in the second holding position. When the first and second levers are in the first and second holding positions, the aperture contained within the frame as well as an aperture associated with the second lever are disposed in an adjoining relationship and collectively define a third aperture. In this closed position, a second structural member may be disposed through this third aperture and restrained from being pulled back through this third aperture. In this regard, the first and second structural members are interconnected when the latch assembly is closed (i.e., the first and second levers are in the first and second holding positions).

Various refinements exist of the features noted in relation to the first aspect of the present invention. Further features may also be incorporated in the first aspect of the present invention as well. These refinements and additional features may exist individually or in any combination. As noted, both the first and second lever are pivotable between holding and release positions. Any way of interconnecting the first and second levers to the frame in a manner that allows them to pivot between these positions may be utilized. Irrespective of the type of interconnection, the first and second levers will pivot about first and second axes, respectively. In one embodiment, the free end of the first lever will extend at least partially toward the pivot axis of the second lever and the free end of the second lever extends at least partially toward the pivot axis of the first lever. This allows a portion (e.g., the free end) of the second lever to be retained beneath at least a portion of the first lever. In a further embodiment, the axes of these levers will be substantially parallel to one another allowing the first and second lever to pivot directly towards one another. In this embodiment, the free end of the second lever will be restrained beneath a portion of the first lever.

In order for the free end of the second lever to be retained beneath the first lever when the axes of the levers are substantially parallel, the length of the second lever, as measured between the pivot axis of the second lever and the free end of the second lever, will be shorter than the distance between the pivot axes of the two levers. In a further embodiment of the parallel axes orientation, the first lever will be long enough to extend beyond the pivot axis of the second lever. In this configuration, the extending free end of the first lever may be restrained to maintain the latch assembly in the closed position. In this regard, the lever arm between where a restraining force is applied to the first lever and the pivot axis of the first lever will be greater than the lever arm between where the free end of the second lever is restrained beneath the first lever and the pivot axis of the first lever. That is, a mechanically advantageous use of leverage may be realized.

The permanent magnet and electromagnet of the assembly are utilized to restrain the first lever in the first holding position when the latch assembly is closed and provide a releasing force that allows the first and second levers to move from their holding positions to their release positions, respectively. In this regard, the permanent magnet may be attached in any appropriate manner to any point along the length of the first lever such that the magnet is able to magnetically couple to a ferromagnetic surface and restrain the first lever in the holding position when desired. In order to maximize the restraining force provided by the permanent magnet to the first lever, the permanent magnet will generally be attached near or toward the free end of the first lever. That is, the distance between the magnet and the pivot axis of the first lever will be maximized to increase the leverage available to the magnetic restraining force.

In one embodiment, the permanent magnet of the assembly couples directly to the ferromagnetic core of the electromagnet when the first lever is in the first holding position (i.e. when the latch is closed). In this configuration, the electromagnet may be in an unactivated state when the permanent magnet is restraining the first lever in the holding position such that the latch assembly utilizes no electrical power when closed. In this embodiment, activation of the electromagnet will release the magnetic coupling of the permanent magnet to the ferromagnetic core and allow the first lever to pivot from the first holding position to the first release position, thereby allowing the second lever to pivot from the second holding position to the second release position. This will cause the second structural member to be released from the first structural member. As will be appreciated, activating the electromagnet may cause the ferromagnetic core to have a magnetic flux that will repulse the previously coupled permanent magnet. That is, the activated electromagnet and permanent magnet will have like magnetic fluxes and repel one another.

As noted, the subject first aspect utilizes a frame that contains a first aperture that, in combination with an aperture on the second lever, defines a third aperture that is utilized to hold the second structural member relative to the first structural member. In one embodiment, the aperture of the frame is contained within a pivotable support platform. This pivotable support platform is disposed in an adjoining relationship with the second aperture of the second lever when the latch assembly is closed. For example, the support platform as well as the second lever may each contain a half circular indention (i.e., aperture) which, when disposed in the adjoining relationship, defines a single circular aperture. Other shapes for the aperture in each of the support platform and the second lever may be appropriate. As will be appreciated, while the latch is closed, the third aperture may be sized to prevent, for example, the flange of a bolt associated with the second structural member from being pulled therethrough. In order to release the second structural member, the collectively defined third aperture may be separated or the size thereof somehow expanded to allow the second member to pass therethrough.

In order to separate or expand the collectively defined third aperture, one or both of the second lever aperture and frame aperture may be moved away from the other structure to eliminate the adjoining relationship between the frame aperture and the second lever aperture. For example, when the second lever moves from the holding position to the release position (i.e., when the latch assembly is opened), the second lever aperture may rotate away from the frame aperture to separate or increase the size of the collectively defined third aperture. Additionally, when the pivotable support platform is utilized, both the second lever and the support platform may move away from one another to eliminate the adjoining relationship. In this regard, any assembly that allows the two structures to move away from one another may be utilized. In one embodiment, a first gear is mounted relative to the support platform and a second gear is mounted on the second lever. Any appropriate means of transferring rotation between the gears may be utilized to translate the rotation from the gear of the second lever to the gear of the support platform. For, example, chains or intermediate gear structures may be utilized. In one embodiment, the teeth on the two gears are directly meshed. In this embodiment when second lever moves from the holding position to the release position, its gear will rotate and the gear on the counter support platform will rotate in an opposite direction. This rotation in the opposite direction will allow the support platform to pivot in an opposite direction from the support lever. Accordingly, the collectively defined aperture may be separated or expanded to allow the second support structure to pass therethrough.

According to a second aspect of the present invention, a remotely operable latch assembly is provided. This remotely operable latch assembly comprises: a frame; a support lever pivotably mounted to the frame for releasably supporting a load when the support lever is in a support position; a restraint lever pivotably mounted to the frame for applying a holding force to maintain the support lever in the support position when the restraint lever is in a closed position; a permanent magnet that is operatively associated with the restraint lever to provide a magnetic restraining force to hold the restraint lever in the closed position; and a remotely actuateable electromagnet for selectively providing a magnetic flux to counteract the magnetic restraining force applied by the permanent magnet to the restraint lever and thereby allow the restraint lever to move from a closed position to an open position. As will be appreciated, when the restraint lever moves to an open position, the support lever is able to release its supported load by moving from a support position to a release position.

Various refinements exist of the features noted in relation to the second aspect of the present invention. Further features may also be incorporated in the second aspect of the present invention as well. These refinements and additional features may exist individually or in any combination. In one embodiment of the second aspect of the present invention, the latch assembly is operable to provide a mechanically advantageous holding force to hold a load as may be applied by a first structure relative to the frame which may be interconnected to a second structure. That is, the latch assembly may be utilized to releaseably hold two structures together. In this regard, the support lever and the restraint lever advantageously utilize leverage about their respective pivotal mountings to provide an increased holding force between the two structures. For example, the support lever is operable to support the loading force (e.g., as applied by a bolt interconnected to a first structure) at a first point along its length, while the holding force utilized to hold the support lever in the support position is applied to a second point along the length of the support lever. Particularly, the loading force is applied at a first point that is nearer to where the support lever is pivotally mounted than is the second point where the holding force is applied. In this regard, the holding force utilizes a longer lever arm to counteract the loading force. It will be appreciated that the holding and loading forces may be applied on one side of the lever in relation to its pivotal mounting or the pivotal mounting may be between where the holding and loading forces are applied to the lever. What is important is that the holding force is able to utilize a longer lever arm in relation to the pivotal mounting to provide a mechanical advantage.

Similarly, the restraint lever provides advantageous leverage for the magnetic restraining force (applied by the permanent magnet when the latch assembly is closed) to provide a greater holding force as applied to the support lever. That is, the magnetic restraining force is applied to the restraint lever at a distance further from its pivotal mounting than the holding force is applied to the support lever. Again, both forces may be applied to the restraint lever on the same side of the lever in relation to its pivotal mounting, or the pivotal mounting may be between where the forces are applied to the lever, so long as the restraint force utilizes a longer lever arm.

As noted, the permanent magnet of the second aspect is associated with the restraint lever and provides a magnetic restraining force to hold the restraint lever in the closed position. In one embodiment, the permanent magnet is magnetically coupled directly to the electromagnet when the restraint lever is in the closed position. In this regard, at least one of the magnets will be fixedly attached to the restraint lever. Due to the necessary electrical wiring of the electromagnet, the permanent magnet will generally be fixedly attached to the restraint lever. Irrespective of which magnet is affixed to the restraint lever, when the latch assembly is closed, the electromagnet will not be actuated and produces substantially no magnetic flux. In this regard, the permanent magnet is able to magnetically couple to the ferromagnetic core of the electromagnet. However, upon selective activation of the electromagnet, which may be done remotely, the electromagnet will produce a like magnetic flux at the interface with the permanent magnet. That is, the electromagnet will provide a repulsive magnetic flux directly to the permanent magnet and thereby release the magnetic restraining force that holds the restraint lever in the closed position. Furthermore, this repulsive magnetic flux may be utilized to initiate the movement of the restraint lever from the closed position to the open position.

As noted, the electromagnet is remotely actuateable. This remote operation allows the latch assembly to be utilized in hazardous environments, space-based applications, and any other environment where direct access to the latching assembly is not feasible. Any way of remotely actuating the electromagnet, which generally comprises completing an electrical circuit through the electrical windings, may be utilized.

According to a third aspect of the present invention, a mechanically advantageous electromagnet latch assembly for holding a first structure member relative to a second structure member is provided. The mechanically advantageous latch assembly includes a frame for mounting to the first structural member; a lever that is pivotally mounted to the frame for applying a holding force to a second structural member when the lever is in a closed position; a permanent magnet operatively associated with the lever for providing a magnetic restraining force to hold the lever in a closed position; and an electromagnet operatively associated with the lever for selectively providing a magnetic flux to release the magnetic restraining force. In the subject third aspect, the electromagnet and the permanent magnet are disposed relative to one another such that they are magnetically coupled when the lever is in the closed position.

Various refinements exist of the features noted in relation to the third aspect of the present invention. Further features may also be incorporated in the third aspect of the present invention as well. These refinements and additional features may exist individually or in any combination. In order to apply a restraining force to hold the lever in the closed position, at least one of the magnets is mounted to the lever while the other magnet is mounted to the frame of the latch assembly. By mounting the magnets so that they are magnetically coupled when the lever is in a closed position, a mechanically advantageous latch assembly can be provided which utilizes no electrical energy while in the closed position. That is, the electromagnet may be selectively actuated to counteract the magnetic restraining force applied by the permanent magnet by providing a repulsive magnetic field when magnet separation is desired to open the latch assembly. As will be appreciated, this provides a passive latch assembly which utilizes no electrical energy while the latch assembly holds the first and second structures together. Furthermore, the disposition of the permanent magnet and electromagnet so that they magnetically couple allows complete elimination of the magnetic restraining force applied to the lever by selectively actuating the electromagnet.

In order to provide a mechanically advantageous force for holding the first structure member to a second structure member, the latch assembly utilizes leverage provided by the lever. That is, the lever applies a holding force to the structure nearer to where it is pivotally mounted than to where the magnetic retraining force is applied to the lever. In this regard, the magnetic restraining force utilizes a longer lever arm and is able to counteract a larger holding force.

According to a fourth aspect of the present invention, a method for operating a latch assembly containing first and second pivotable levers is provided. The method comprises the steps of first restraining the first lever in a first holding position, which may be a closed position for the latch assembly, utilizing a magnetic coupling. This first restraining step is utilized to secondly restrain the second lever in a second holding position. This restraining of the first and second levers releaseably interconnects the first and second members to one another. At a predetermined time, this interconnection may be terminated by terminating the magnetic coupling. Termination of the magnetic coupling allows the first lever to pivot to a first release position and the second lever to pivot to a second release position. Combined, the pivoting of the first and second levers to first and second release positions releases the first member from the second member.

Various refinements exist of the features noted in relation to the fourth aspect of the present invention. Further features may also be incorporated in the fourth aspect of the present invention as well. These refinements and additional features may exist individually or in any combination. For instance, using the magnetic coupling in the first restraining step may comprise coupling one pole of a permanent magnet to the ferromagnetic core of a non-activated electromagnet. That is, one of the magnets may be affixed to the first lever and magnetically coupled to the other magnet using the magnetic force of the permanent magnet. In this regard, the terminating step may be achieved by activating the electromagnet so that the same polarity exists on both magnets where the magnets are coupled. As will be appreciated, these like magnetic poles will repulse one another. This repulsive force may also be utilized as a contributing force to pivot the first lever from the first support position to the first release position and therefore aid in separating the first and second members.

Each of the levers is operable to pivot between holding and release positions. In this regard, the levers contain a pivot point along their length and at least one free end that is operable to pivot about this pivot point. Accordingly, lo the steps of restraining these levers may comprise restraining one of their free ends to prevent their pivoting. For example, the permanent magnet may be attached to a free end of the first lever and be operable to restrain that end of the lever in a fixed position. In one embodiment, restraining the second lever step comprises restraining a free end of the second lever beneath a portion of the first lever when the first lever is restrained. Preferably, both restraining steps will comprise applying a restraining force to each respective lever at a point more distally located on that lever than the application of any forces/loads utilized to interconnect the first and second members relative to one another.

Interconnection of the first and second members, may be done in any appropriate manner that allows the latch assembly to releaseably hold the members together while the first and second levers are in the first and second holding positions, respectively. In one embodiment, the interconnection step comprises passing a portion of one of the members, such as a bolt affixed with one of the members, through an aperture at least partially defined by the second lever. In this interconnection step, part of the member (e.g., bolt) will be restrained from passing through the aperture while the second lever is in the second holding position. Further, this portion of the member passing through the aperture may be loaded (e.g., tightening a bolt) to securely interconnect the members together. This loading may apply a force to the second lever that may be utilized to pivot the second lever to the second release position upon termination of the magnetic coupling. Regardless, when the second lever pivots to the release position, the disconnecting step will include the previously restrained part of the member disposed through the aperture passing relative to the aperture so the first and second members are disconnected.

BRIEF DESCRIPTION OF THE DRAWINGS

FIGS. 3a–3d each show a plan side view of the latch assembly of FIG. 1, moving from a closed position to an open position;

DETAILED DESCRIPTION

Figure 1:
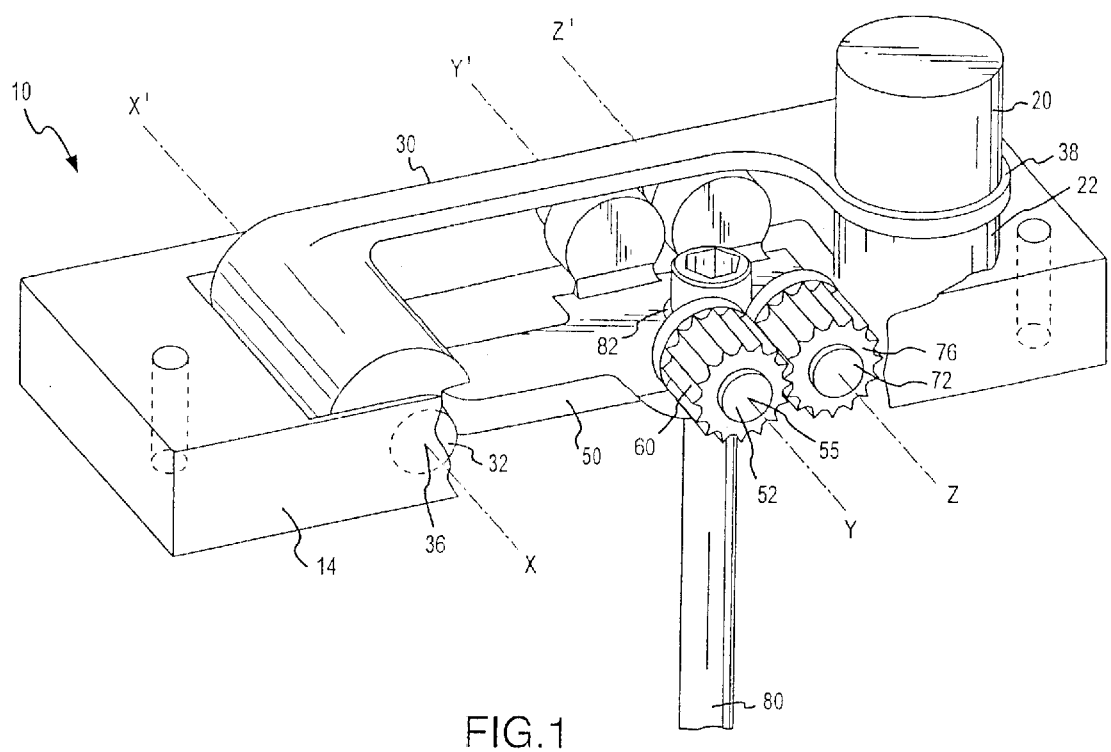
FIG. 1 shows a top perspective view of one embodiment of a remotely operable magnetic latch assembly.

The present invention will now be described in relation to the accompanying drawings which at least partially assist in illustrating its various pertinent features. FIG. 1 shows a perspective view of one embodiment of the remotely operable electromagnetic latch assembly 10. Though discussed herein in relation to releasably holding a payload relative to a spacecraft, it is to be understood the electromagnetic latch assembly 10 may be utilized in any application requiring a mechanically advantageous, remotely operable latching device. The latch assembly 10 contains a frame 14 that may be fixedly interconnected (e.g., bolted) to a support structure or a first structural member, such as a space launch vehicle, and a pair of levers 30, 50 that are utilized to releasably hold an object or a second structural member relative to that support structure. These levers, a support lever 50 and restraint lever 30, are each pivotally mounted to the frame 14 of the latch assembly 10 and produce an amplified holding force for restraining a bolt 80, interconnected to a payload, when the latch assembly 10 is closed as shown. That is, the holding force applied to the bolt 80 by the latch assembly 10 is considerably greater than the restraining force required to maintain the latch assembly 10 in its closed position (i.e., mechanically advantageous holding force). Though described herein in connection with utilizing a single latch assembly 10 to hold an object to a support structure, it will be appreciated that a plurality of these latch assemblies 10 may be utilized to releasably secure one or more objects to a support structure. Further, the various components of the latch assembly 10 may be made of any material(s) that imparts the desired mechanical requirements to withstand forces applied thereto by bolt 80. However, for space-based applications it will be appreciated that due to weight constraints, lightweight materials such as aluminum and/or titanium may be preferable.

Figure 5:
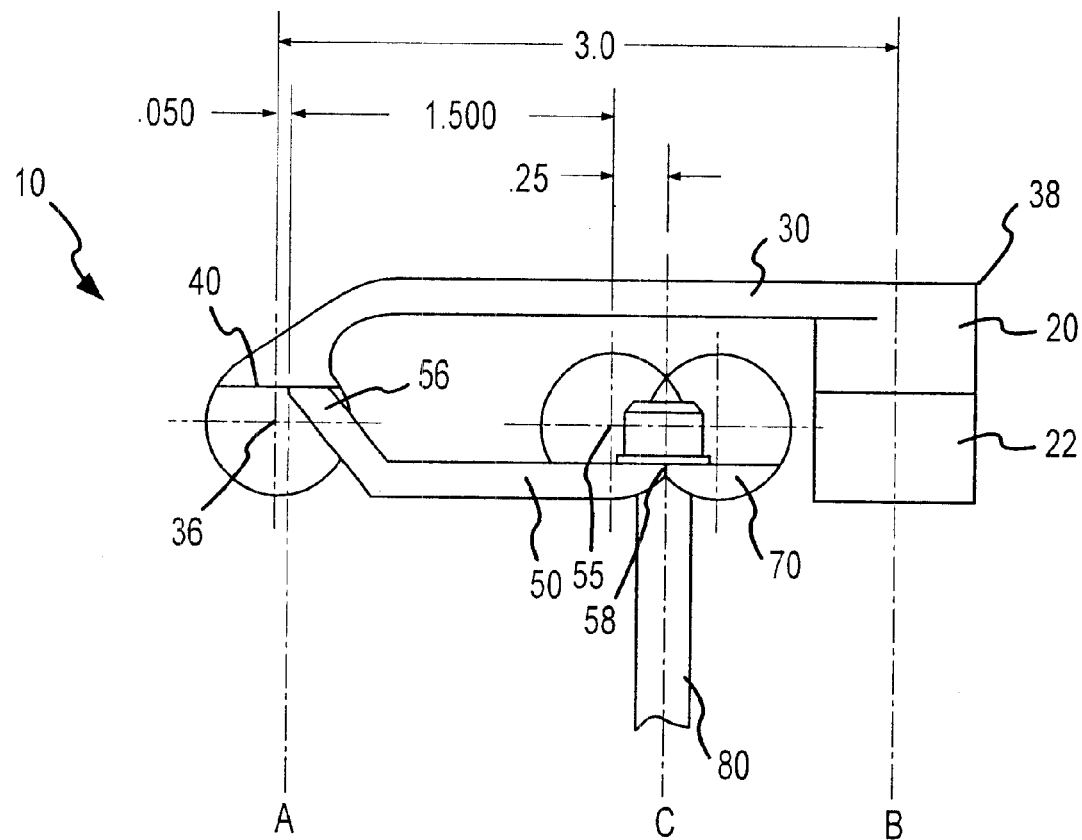
FIG. 5 shows a plan side view of the latch assembly of FIG. 1 and the mechanically advantageous holding force produced thereby.

As noted, the electromagnetic latch assembly 10 utilizes a dual lever mechanism to apply a mechanically advantageous holding force to a bolt 80 interconnected to a releasable object such as a spacecraft's payload. To produce this mechanical advantage when the latch assembly 10 is closed, each pivotally mounted lever 30, 50 supports a load at a first point along its length relative to its pivot mounting 36, 55 (as will be more fully discussed herein) while being restrained at a second point along its length relative to its pivot mounting 36, 55. Referring to FIG. 5, in the case of the restraint lever 30, an upward loading force is applied to the restraint lever 30 at a first point aligned with reference line "A" near the pivot mounting 36 of the restraint lever 30 (see FIG. 5). To prevent the restraint lever 30 from moving, a downward force is applied to the restraint lever 30 at a second point aligned with reference line "B" that is further from the pivot mounting 36 of the restraint lever 30. With regards to the support lever 50, a downward load applied by the bolt 80 at a first point aligned with reference line "C" is nearer to the pivot mounting 55 of the support lever 50 than the restraining force applied by the restraint lever 30 at point "B." As will be appreciated, this arrangement allows the restraining forces to utilize the levers 30, 50 as lever arms to counteract the load forces. In this regard, the resulting leverage allows a smaller restraining force to counteract a greater load force.

Figure 2:
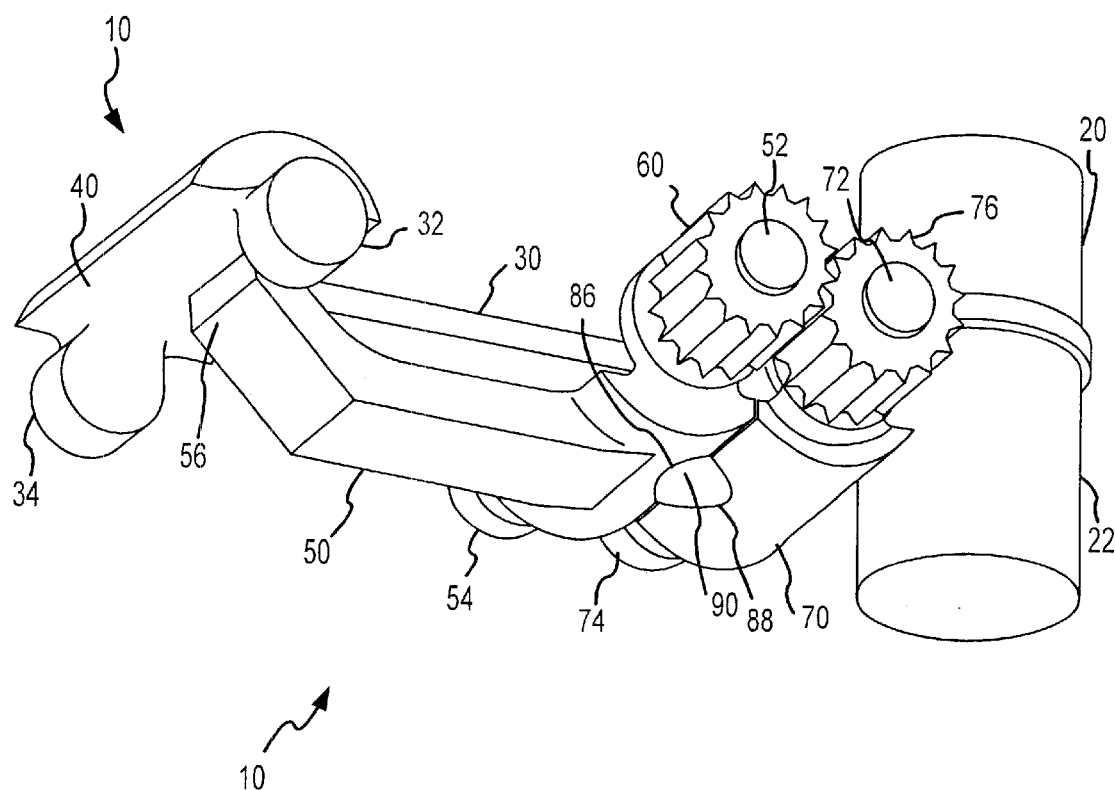
FIG. 2 shows a bottom perspective view of the latch assembly of FIG. 1.

FIGS. 1 and 2 show top and bottom perspective views of the latch assembly 10, respectively. For clarity, a front portion of the frame 14 is cut away to better illustrate the assembly's pertinent features in FIG. 1, while in FIG. 2 the entire frame 14 and bolt 80 have been removed. Referring initially to the support lever 50, the first mechanically advantageous holding force of the latch assembly 10 is described. The support lever 50 contains first and second journals 52, 54 interconnected to its lateral edges at a point between the support end 58 and the free end 56 of the support lever 50. These journals 52, 54 define a fulcrum axis (Y–Y') about which the support lever 50 may pivot. These journals 52, 54 are each received by bushings or bearing assemblies (not shown) contained within the frame 14. In this regard, the journals 52 and 54 define a pivot mounting 55 about which the support end 58 and free end 56 of the support lever 50 are able to rotate when not restrained.

The support end 58 of the support lever 50 contains an aperture 86 designed to releasably support a bolt 80 interconnectable to the payload. Any suitably designed aperture 86 that allows the bolt 80 to be released when the support lever 50 rotates from a support position to a release position may be utilized. For example, the aperture 86 on the support end 58 of the support lever 50 may comprise a clevis or U-shaped member that restrains a flange 82 on the bolt 80 while the support lever 50 is maintained in support position (i.e., the latch assembly 10 is closed). In the present embodiment, the latch assembly 10 utilizes a counter-support platform 70 of the frame 14 in conjunction with the support end 58 of the support lever 50 to restrain the bolt 80. This counter-support platform 70 contains first and second journals 72, 74 defining an axis of rotation (Z–Z') about which the platform 70 is able to pivot relative to adjacent portions of the frame 14 on which the journals 72, 74 are mounted. Again, these journals 72, 74 are receivable within bushings/bearings (not shown) supported by the frame 14 that allow the support platform 70 to freely rotate when the latch assembly 10 opens. A first gear 60 is affixed to one of the journals 52 of the support lever 50 and meshes with a second gear 76 affixed to the corresponding support platform journal 72. In this regard, when the support lever 50 rotates in a first direction, the intermeshed first and second gears 60 and 76 cause the support platform 70 to rotate in the opposite direction. As shown in FIG. 2, the support end 58 of the support lever 50 contains an aperture 86 in the form of a half circle indention that mates with another aperture 88 in the form of a half circle indention on the counter-support platform 70. Collectively these apertures 86 and 88 define a circular aperture 90 when the latch assembly 10 is in a closed position. Accordingly, the circular aperture 90 is sized to allow the body of the bolt 80 to pass therethrough, while a flange 82 on the bolt 80 is restrained by and rests atop the substantially planer surface formed by the top surfaces of the support lever 50 and the counter-support platform 70 when the latch assembly 10 is closed. That is, the bolt 80 cannot be pulled back through the aperture 90 when the latch assembly 10 is closed.

When the latch assembly 10 is closed, the support lever 50 is in a support position (FIGS. 1, 2, and 3A), where the counter support platform 70 of the frame 14 and support end 58 of the support lever 50 mate to restrain the bolt 80. In order to remain in this support position, the free end 56 of the support lever 50 is secured beneath an abutment 40 on the restraint lever 30. As will be appreciated, in this support position, the bolt member 80 applies a load nearer to the pivot mounting 56 of the support lever 50 in comparison with the restraint force applied to the free end 56 of the support lever 50 by the restraint lever 30. That is, the load applied to the support lever 50 by the bolt 80 has a shorter lever arm in relation to the pivot mounting 56 of the support lever 50 than does the restraining force. Accordingly, a smaller restraining force in comparison with the load applied by the bolt 80 is sufficient to maintain the support lever 50 in the static support position.

The pivotally mounted restraint lever 30 also contains first and second journals 32, 34 that define a fulcrum axis X–X' about which the restraint lever 30 may rotate or pivot. In particular, the journals 32, 34 are mounted to one end of the restraint lever 30 and along the fulcrum axis X–X' define a pivot mounting 36 for the restraint lever 30. Though shown as forming a pivot mounting 36 at one end of the restraint lever 30, it will be appreciated that the pivot mounting 36 may be located anywhere along the length of the restraint lever 30. The other or "free end" 38 of the restraint lever 30 is able operable to rotate about the pivot mounting 36. As noted, the restraint lever 30 contains an abutment 40 for applying a restraining force to the free end 56 of the support lever 50. The abutment 40 is part of the pivot mounting 36 of the restraint lever 30 and interconnects the journals 32, 34 of the restraint lever 30. However, the abutment 40 is offset from the fulcrum axis X–X' defined by the journals 32, 34, allowing it to rotate away from the free end 56 of the support lever 50 when the restraint lever 30 moves from a closed position to an open position. That is, when the restraint lever 30 is in the closed position as shown in FIG. 1, the free end 56 of the support lever 50 is trapped beneath a planer surface defined by the abutment 40 at a point near the pivot mounting 36 of the restraint lever 30 (see FIG. 5). When the latch assembly 10 is opened, the abutment 40 rotates away from the free end 56 of the support lever 50 (see FIGS. 3A–D), thus freeing the support lever 50 to rotate. Further, as shown in FIG. 1, the restraint lever 30 is offset from the longitudinal centerline of the latch assembly 10, allowing access to the circular aperture 90 defined by the support end 58 of the support lever 50 and counter-support platform 70 while the restraint lever 30 is in the closed position. As will be appreciated, this allows insertion and loading of the bolt 80 from above the latch assembly 10 while the latch assembly 10 is in the closed position.

The latch assembly 10 utilizes a permanent magnet 20 to provide a magnetic restraining force that holds the restraint lever 30 in the closed position shown in FIGS. 1 and 2. In this regard, the permanent magnet 20 is mounted near the free end 38 of the restraint lever 30 in order to maximize the lever arm about the pivot mounting 36 of the restraint lever 30. However, the permanent magnet 20 may be mounted on any portion of the restraint lever 30 that is able to rotate or pivot about the pivot mounting 36. This produces a moment about the pivot mounting 36 of the restraint lever 30 that is equal to the restraining force produced by the permanent magnet 20 times the lever arm distance, measured from the fulcrum axis X–X' to where the magnetic restraining force is applied to the restraint lever 30. Generally, to maximize this moment, the permanent magnet 20 is attached as near to the free end 38 of the restraint lever 30 as possible. Accordingly, the moment produced about the pivot mounting 36 may be increased/decreased by either increasing/decreasing the magnetic force applied by the permanent magnet 20 (e.g., changing the size of the magnet) and/or by forming a restraint lever 30 with a desired length to adjust the length of the resulting lever arm.

The permanent magnet 20 may be affixed to the restraint lever 30 in any appropriate manner. As shown, the free end 38 of the restraint lever 30 contains an aperture correspondingly shaped to the shape of the permanent magnet 20. This aperture is sized slightly smaller than the permanent magnet 20, allowing for the permanent magnet 20 to be press-fit within the aperture. As will be appreciated, this securely attaches the permanent magnet 20 to the free end 38 of the restraint lever 30 without the use of additional connectors/ hardware. Further, press-fitting allows the permanent magnet 20 to be affixed to any material utilized to construct the restraint lever 30 of the latch assembly 10, such as, for example, steel, aluminum, titanium, etc. In order for the permanent magnet 20 to apply a magnetic restraining force for holding the restraint lever 30 in the closed position, it must be able to magnetically couple with a ferromagnetic material (i.e., iron, steel). In this regard, the permanent magnet 20 is mounted on the free end 38 of the restraint lever 30 to allow one of its poles (i.e., positive/negative) to be disposed through the aperture and provides an interface surface for magnetically coupling with a ferromagnetic object.

Figure 4A:
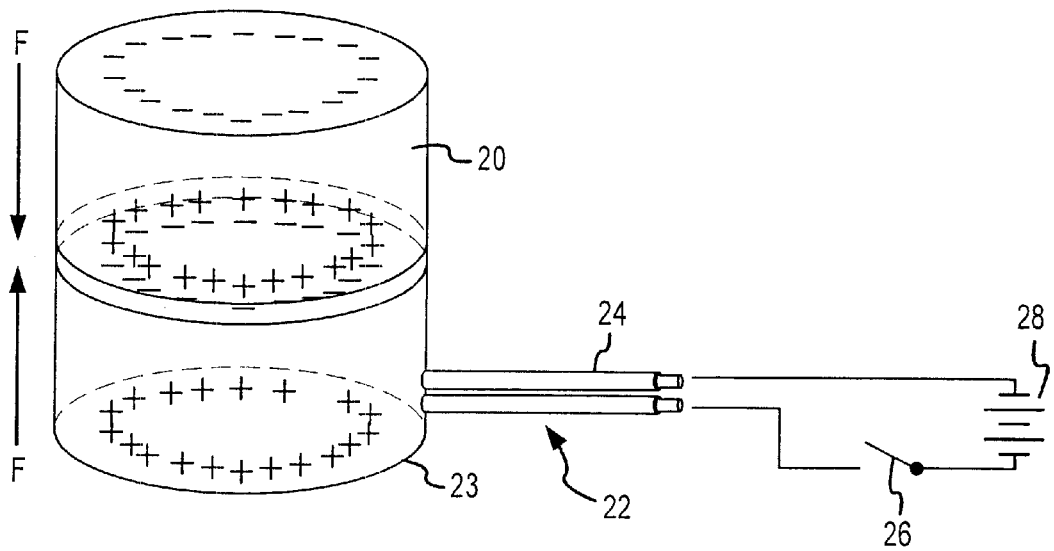
FIGS. 4a–4b each show a perspective view of the permanent magnet and remotely operable electromagnet utilized with the latch assembly of FIG. 1.
Figure 4B:
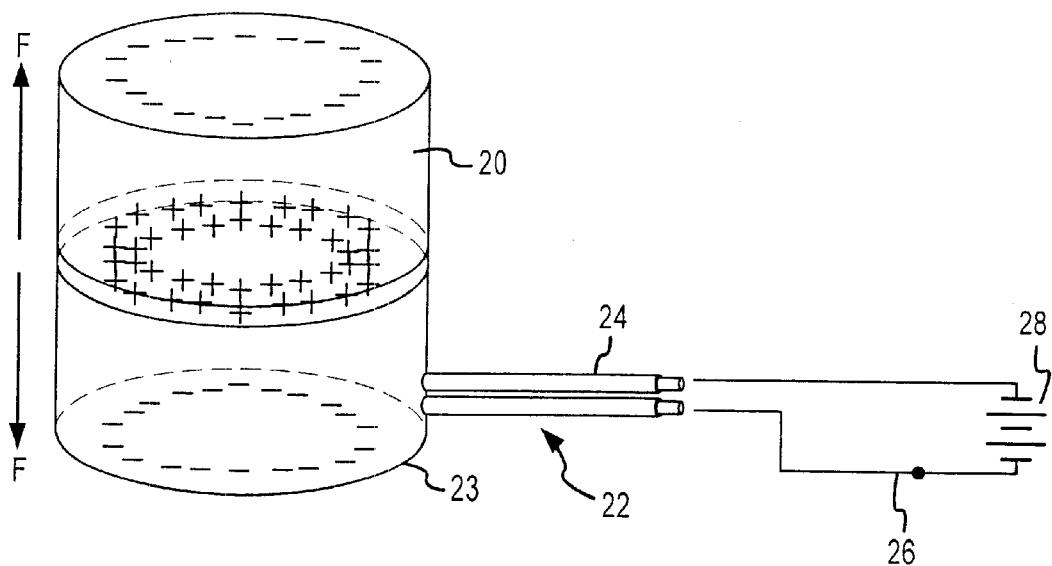

The latch assembly 10 further includes an electromagnet 22 that is interconnected to the frame 14 in a position that allows the permanent magnet 20 to magnetically couple thereto when the latch assembly 10 is closed (see FIGS. 4a and 4b). This electromagnet 22 generally comprises a ferromagnetic core 23, such as iron, wound with coils of insulated wires 24 (not fully shown), typically in the form of a helix. Passing an electrical current through these coils induces a strong magnetic field or "flux" along the axis of this helix. Accordingly, the electromagnet 22 includes a DC power supply 28 as well as a remotely operable switching mechanism 26 for selectively opening and closing the circuit through the electromagnet 22, thereby selectively actuating the magnetic field of the electromagnet 22. Any remotely operable switching mechanism able to selectively open and close an electrical circuit is sufficient for use with the latch assembly 10 and considered within the scope of the present embodiment. Though discussed as having only a single set of windings, it will be appreciated that in space-based applications a redundancy system is often used. In this regard, the electromagnet 22 may utilize two full sets of windings, power supplies, and switching mechanisms.

When the switching mechanism 26 is open (FIG. 4a), the electromagnet 22 produces little or no magnetic flux. In this regard, the permanent magnet 20 is able to magnetically couple to the ferromagnetic core 23 of the electromagnet 22 and thereby securely fastens or holds the restraint lever 30 in the closed position. This in turn holds the support lever 50 in the support position as well. Upon closing the remotely operable switching mechanism 26 (FIG. 4b), the electromagnet 22 is actuated and produces a magnetic flux. Depending on the direction of electricity flow through the circuit as well as the winding of the insulated wires 24 about the ferromagnetic core 23, a particular magnetic flux (i.e., positive or negative) can be selected to exist at the surface interfacing with the permanent magnet 20. Therefore, to release the magnetic coupling force applied between the permanent magnet 20 and ferromagnetic core 23, a positive magnetic field (FIG. 4B) is applied to the interface surface of the permanent magnet 20, which also has a positive magnetic field. As will be appreciated, like magnetic fields repel one another, therefore, when the electromagnet 22 produces a positive magnetic field, the electromagnet 22 and permanent magnet 20 will both have positive fields (i.e., like magnetic poles) at the interface surface and thus repel one another. This provides two benefits; first, actuation of the electromagnet 22 eliminates the restraining force applied by the permanent magnet 20 to the restraint lever 30, thereby releasing the free end 38 of the restraint lever 30 (i.e., there is a termination of the magnetic coupling) and, second; provides a repulsive force that initiates the rotation of the restraint lever 30 about its pivot mounting 36. Accordingly, this rotation results in releasing the bolt 80 from the support lever 50, as will be more fully discussed herein. It will be appreciated that up to the point of magnet separation, the electromagnetic latch assembly 10 provides an amplified holding force that requires no electrical power. The only time power is utilized is for the separation of the latch assembly 10. Further, it will be noted that the use of electricity to release the latch assembly 10 allows a plurality of latch assemblies 10 to simultaneously release one or more structures by, for example, wiring these latch assemblies in parallel or series in a common electrical circuit. That is, one switching mechanism 26 may actuate a plurality of electromagnetic latch assemblies 10.

FIGS. 3A–3D show a side view (with the frame 14 having been removed) of the operation of the electromagnetic latch assembly 10. As shown in FIG. 3A, the latch assembly 10 is closed with the permanent magnet 20 being magnetically coupled to the non-actuated electromagnet 22. In FIG. 3B, the electromagnet 22 is actuated to produce a repulsive magnetic field that is applied directly to the interface surface with the permanent magnet 20 and thus releases the restraint lever 30. This repulsive force applied by the electromagnet 22 also begins rotation of the restraint lever 30 about its pivot mounting 36. Additionally, the bolt 80 is loaded with a predetermined force that applies a downward force to the support lever 50 which is translated to an upward force on the support lever free end 56. That is, as shown in FIG. 5, the bolt 80 applies a downward force to the support lever 50 at point "C" such that the pivot mounting 55 of the support lever is between the bolt load and the free end 56 of the support lever 50. This upward force is, in turn, applied to the restraint lever 30 and assists in opening the latch assembly 10 when the restraint lever 30 is released from its closed position. As shown in FIG. 3C, as the restraint lever 30 continues its upward arcuate path, the restraint lever abutment 40, utilized to apply the restraining force to the free end 56 of the support lever 50, rotates away from and releases the support lever 50, which allows the support lever 50 to begin to rotate about its pivot mounting 55. The rotation of the support lever 50 is translated to the counter-support platform 70 through gears 60 and 76. As shown in FIGS. 3C and 3D, when the support lever 50 rotates in a clockwise direction, the counter support platform 70 rotates in a counterclockwise direction. In this regard, when the support lever 50 begins to rotate in a clockwise direction the gear 60 interconnected to journal 52 also rotates in a clockwise manner. Accordingly, as the first gear 60 of the support lever 50 is enmeshed with the second gear 76 of counter-support platform 70, the second gear 76 as well as the counter-support platform 76 rotate counterclockwise. As a result of this dual rotation, the aperture 90 formed by the support lever 50 and counter-support platform 70 separates until the bolt flange 82 is able to pass therebetween and release an object held by the electromagnetic latch assembly 10 As will be appreciated, the latch assembly 10, where feasible, may be reset and reused by lowering the support lever 50 into the support position, and magnetically coupling the permanent magnet 20 to the non-actuated electromagnet 22.

FIG. 5 shows one embodiment of the mechanically advantageous holding force achieved by the electromagnetic latch assembly 10. It will be appreciated that FIG. 5 is shown solely for illustrative purposes and that the dimensions provided herewith as well as the loads applied to the latch assembly 10 are provided solely for the better understanding of the advantages that may be realized by the configuration of the latch assembly 10 and are in no way limitations. In the embodiment of FIG. 5, the permanent magnet 20 provides a 20 $lb_f$ magnetic restraining force to the free end 38 of the restraint lever 30. In this embodiment, the restraint lever 30 provides a lever arm for the permanent magnet 20 of three inches; therefore, the permanent magnet 20 applies a 60 inch pound restraining moment about the fulcrum axis X–X' of the restraint lever 30 (i.e., length times force). This 60 inch pound force is utilized to restrain the free end 56 of the support lever 50. As shown, the free end 56 of the support lever 50 applies an upward force to the abutment 40 of the restraint lever 30 at a distance of about 0.05 inches from the fulcrum axis X–X' of the restraint lever 30. As a result of the differences in the length of the lever arm utilized by each force, the 20 $lb_f$ magnetic restraining force applied by the permanent magnet 20 is able to counteract an upward force of 1200 $lb_f$ applied by the free end 56 of the support lever 50.

$$(20 \text{ lb}_f)(3 \text{ in.}) = (x \text{ lb}_f)(0.05 \text{ in.}); \quad x = 1200 \text{ lb}_f \qquad (1)$$

As will be appreciated, this provides the first mechanically advantageous holding force for the latch assembly 10. The second mechanically advantageous holding force for the latch assembly 10 is provided by the support lever 50. In this regard, the bolt 80 applies a downward load to the support lever 50 at a point 0.25 inches from the support lever fulcrum Y–Y'. The downward load of the bolt 80 is counteracted by the restraining force applied to the free end 56 of the support lever 50, which is applied about 1.5 inches from the support lever fulcrum Y—Y.' In the present embodiment, where the permanent magnet 20 applies a 20 lb$_f$ magnetic restraining force to the restraint lever 30, a 1200 lb. restraining force is applied to free end 56 of the support lever 50. Accordingly, the 1200 lb$_f$ restraining force is able, utilizing the 1.5 inch lever arm, to counteract a downward force applied by the bolt 80 at a distance of about 0.25 inches from the fulcrum Y–Y' of 7200 lbs.

$$(1200 \text{ lb}_f)(1.5 \text{ in.}) = (y \text{ lb}_f)(0.25 \text{ in.}); \quad y = 7200 \text{ lb}_f \qquad (2)$$

As will be appreciated, the relative lengths of the levers 30, 50, as well as the restraining force applied by the permanent magnet 20 may be adjusted to provide a desired restraining force.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A remotely operable latch assembly, comprising:
   a frame;
   a support lever pivotally mounted to said frame for releasably supporting a load when said support lever is in a support position;
   a restraint lever pivotally mounted to said frame for applying a holding force to hold said support lever when in said support position and when said restraint lever is in a closed position;
   a permanent magnet operatively associated with said restraint lever for providing a magnetic restraining force to hold said restraint lever in said closed position; and
   a selectively actuable electromagnet operatively associated with said restraint lever for selectively providing a magnetic flux to counteract said magnetic restraining force, allowing said restraint lever to move from said closed position to an open position, wherein said holding force applied to said support lever is released.

2. The assembly of claim 1, wherein said support lever is operable to move from a support position to a release position, releasing said load upon said restraint lever moving from said closed position to said open position.

3. The assembly of claim 2, wherein said support lever supports said load at a first point along its length and said holding force is applied to said support lever at a second point along its length.

4. The assembly of claim 3, wherein said first point is nearer to where said support lever is pivotally mounted than is said second point.

5. The assembly of claim 4, wherein said restraint lever applies said holding force to said support lever at a first position along its length while said magnetic restraining force is applied at a second position along its length.

6. The assembly of claim 5, wherein said first position is nearer to where said restraint lever is pivotally mounted than is said second position.

7. The assembly of claim 1, wherein said permanent magnet is fixedly attached to said restraint lever.

8. The assembly of claim 7, wherein said permanent magnet and said electromagnet are magnetically coupled when said restraint lever is in said closed position.

9. The assembly of claim 8, wherein when said electromagnet is not actuated, said electromagnet provides substantially no magnetic flux and said restraint lever remains in said closed position.

10. The assembly of claim 8, wherein said electromagnet is selectively actuable to provide a repulsive magnetic flux directly to said permanent magnet to release said magnetic restraining force and allow said restraint lever to move from said closed position to said open position.

11. An electromagnetic latch assembly for holding a first structure member relative to a second structure member, comprising:
    a frame for mounting to said first structure member;
    a lever pivotally mounted to said frame operable to apply a holding force to said second structure member when said lever is in a closed position;
    a permanent magnet operatively associated with said lever for providing a magnetic restraining force to hold said lever in said closed position; and
    an electromagnet operatively associated with said lever for selectively providing a magnetic flux to release said magnetic restraining force, wherein one of said electromagnet and said permanent magnet is fixedly interconnected to said lever and said electromagnet and said permanent magnet are magnetically coupled to one another when said lever is in said closed position.

12. The assembly of claim 11, wherein the other of said permanent magnet and said electromagnet is mounted to said frame allowing said permanent magnet and said electromagnet to magnetically couple when said lever is in said closed position.

13. The assembly of claim 12, wherein said electromagnet is selectively operable to provide a repulsive magnetic flux directly to said permanent magnet to release said magnetic restraining force.

14. The assembly of claim 11, wherein said electromagnet produces substantially no magnetic flux when said lever is in said closed position.

15. The assembly of claim 11, wherein said holding force applied by said lever is applied at a first position along the length of said lever and said magnetic restraining force is applied to a second position along the length of said lever.

16. The assembly of claim 15, wherein said first position is nearer to where said lever is pivotally mounted than is said second position.

17. The assembly of claim 11, further comprising:
    a second lever pivotally mounted to said frame for supporting said second structural member relative to said first structural member when said support lever is in a support position, wherein said holding force maintains said second lever in said support position when said first lever is in said closed position.

18. The assembly of claim 17, wherein said second lever supports said second structural member at a first position along its length and said holding force is applied to said second lever at a second position along its length.

19. The assembly of claim 18, wherein said first position is nearer to said pivotal mounting of said second lever than is said second position.

20. The assembly of claim 11, wherein said electromagnet is remotely actuable.

21. An electromagnetic latch assembly, comprising:
a frame interconnectable with a first member and comprising a first aperture;
a first lever interconnected with said frame, pivotable between a first holding position and a first release position, and comprising a first free lever end;
a second lever interconnected with said frame, pivotable between a second holding position and a second release position, and comprising a second free lever end and a second aperture, wherein said second free lever end is retained under said first lever in said second holding position when said first lever is in said first holding position, and wherein said first and second apertures are disposed in adjoining relation to collectively define a third aperture when said first and second levers are in said first and second holding positions, respectively, wherein a second structural member is disposable through said third aperture and restrainable from being pulled back through said third aperture such that the first and second structural members are interconnected when said first and second levers are in said first and second holding position, respectively;
a permanent magnet associated with said first lever; and
an electromagnet operatively associated with said first lever.

22. A latch assembly, as claimed in claim 21, wherein:
said first lever pivots about a first pivot axis and said second lever pivots about a second pivot axis, wherein said first free lever end extends at least toward said second pivot axis and said second free lever end extends at least toward said first pivot axis.

23. A latch assembly, as claimed in claim 21, wherein:
said first and second levers are interconnected with said frame to pivot in at least substantially parallel relation.

24. A latch assembly, as claimed in claim 21, wherein:
said first lever pivots about a first pivot axis and said second lever pivots about a second pivot axis, wherein a first distance between said first pivot axis and said first free lever end is greater than a second distance between said second pivot axis and said second free lever end.

25. A latch assembly, as claimed in claim 21, wherein:
said first lever pivots about a first pivot axis and said second lever pivots about a second pivot axis, and wherein said first lever extends beyond both said second free lever end and said second pivot axis.

26. A latch assembly, as claimed in claim 21, wherein:
said permanent magnet is attached to said first lever and said electromagnet is attached to said frame.

27. A latch assembly, as claimed in claim 21, wherein:
said frame comprises a pivotable first support platform, wherein said first aperture is formed in said first support platform.

28. A latch assembly, as claimed in claim 27, further comprising:
a first gear fixedly mounted on said support platform and a second gear fixedly mounted on said second lever, wherein a rotation of said second gear by a pivoting of said second lever from said second holding position toward said second release position rotates said first gear to pivot said first support platform.

29. A latch assembly, as claimed in claim 21, wherein:
said permanent magnet and said electromagnet are magnetically coupled when said electromagnet is inactive to retain said first lever in said first holding position, thereby retained said second lever in said second holding position, and wherein activation of said electromagnet magnetically de-couples said permanent magnet and said electromagnet.

30. A method for operating a latch assembly comprising first and second levers that are each pivotable, said method comprising the steps of:
restraining said first lever in a first holding position, wherein said restraining step comprises using a magnetic coupling;
restraining said second lever in a second holding position using said restraining said first lever step;
interconnecting first and second members using said restraining said first lever step and said restraining said second lever step;
terminating said magnetic coupling;
pivoting said first lever to a first release position after said terminating step;
pivoting said second lever to a second release position after said terminating step; and
disconnecting said first member from said second member using both said pivoting said first lever step and said pivoting said second lever step.

31. A method, as claimed in claim 30, wherein:
a permanent magnet is attached to said first lever, wherein said terminating step comprises creating a repulsive polarity on an electromagnet and thereby repelling said permanent magnet away from said electromagnet, wherein at least a contributing force for executing said pivoting said first lever step is provided by said repelling step.

32. A method, as claimed in claim 30, wherein:
at least a contributing force for executing said pivoting said second lever step is provided by a force exerted on said second lever by said second member.

33. The method, as claimed in claim 30, wherein:
said restraining said second lever step comprises restraining a free end of said second lever beneath said first lever.

34. The method, as claimed in claim 33, wherein:
said restraining said second lever beneath said first lever step comprises restraining said free end beneath said first lever at a point nearer to where said first lever pivots than where said magnetic coupling restrains said lever in said first holding position.

35. The method, as claimed in claim 30, wherein:
said interconnecting step comprises passing at least a portion of one of said first and second members through an aperture that is at least partially defined by said second lever while said second lever is restrained in said second holding position.

36. The method, as claimed in claim 35, wherein:
said passing step comprises passing a first portion of at least one of said first and second members through said aperture while a second portion of that member is restrained from passing through said aperture while said second lever is restrained in said second holding position.

37. The method, as claimed in claim 36, wherein:

said disconnecting step further comprises passing said second portion through at least a portion of said aperture when said second lever pivots from said holding position to said second release position.

38. A method for operating a latch assembly comprising a lever, comprising the steps of;

first moving said lever from a first position to a second position, wherein first and second members are interconnected with said lever in said second position;

coupling a permanent magnet to a non-actuated electromagnet with a magnetic retaining force, said magnetic retaining force being operable to maintain said lever in said second position;

actuating said electromagnet to de-couple electromagnet and said permanent magnet; and second moving said lever from said second position to said first position after said actuating step, such that said first and second members may be disconnected.

39. The method of claim 38, wherein said actuating step comprises eliminating said magnetic retaining force between said permanent magnet and said actuated electromagnet.

40. The method of claim 38, wherein said actuating step comprises generating a magnetic field.

41. The method of claim 40, wherein said actuating step comprises repelling said permanent magnet away from said electromagnet.

42. The method of claim 41, wherein one of said permanent magnet and said electromagnet is attached to said lever.

43. The method of claim 42, wherein at least a contributing force for executing said second moving step is said repelling step.

44. The method of claim 38, wherein said coupling step comprises magnetically attracting a first pole of said permanent magnet toward a portion of said nonactuated electromagnet.

45. The method of claim 38, wherein said coupling step comprises restraining a free end of said lever using said magnetic restraining force.

46. The method of claim 45, further comprising the step of:

passing at least a portion of one of said first and second members through an aperture at least partially defined while said lever is in said second position.

47. The method of claim 44, wherein:

said passing step comprises passing a first portion of at least one of said first and second members through said aperture while a second portion of that member is restrained from passing through said aperture while said lever is in said second position.

48. The method of claim 47, wherein:

said second moving step further comprises passing said second portion through at least a portion of said aperture in conjunction with said lever moving from said second position to said first position.

* * * * *